United States Patent [19]

Pagano

[11] Patent Number: 4,920,367

[45] Date of Patent: Apr. 24, 1990

[54] BALLISTIC RATED CAMERA HOUSING AND METHOD FOR FORMING

[76] Inventor: Raymond V. Pagano, P.O. Box 802, Lithonia, Ga. 30058

[21] Appl. No.: 280,305

[22] Filed: Dec. 5, 1988

Related U.S. Application Data

[62] Division of Ser. No. 64,401, Jun. 22, 1987, Pat. No. 4,796,039.

[51] Int. Cl.[5] .............................................. G03B 29/00

[52] U.S. Cl. ...................................... 354/81; 352/242; 358/108

[58] Field of Search ................... 354/81, 82, 288, 293; 248/179, 183; 352/34, 242; 358/108; 428/911

[56] References Cited

U.S. PATENT DOCUMENTS

| | | | |
|---|---|---|---|
| 3,732,368 | 5/1973 | Mahlab | 358/108 |
| 3,819,856 | 6/1974 | Pearl et al. | 358/168 |
| 4,320,949 | 3/1982 | Pagano | 354/81 |

*Primary Examiner*—L. T. Hix

*Assistant Examiner*—Brian W. Brown

*Attorney, Agent, or Firm*—James B. Middleton

[57] ABSTRACT

A housing for a surveillance camera protects the camera from damage from projectiles, including small firearms. The housing is generally spherical for reducing wind resistance, and is ballistically rated. The housing is formed of three layers to achieve the ballistic rating while maintaining low weight. A rubber-containing thermoplastic alloy provides the outer surface, an acrylic is intermediate, and ballistic aluminum is the interior layer. The camera is fully rotatable, and a ballistically rated hemisphere rotates with the camera while a clear window allows the camera to see. An outer cover is made of acrylic which may be tinted to conceal the camera window. A blower is mounted within the housing at the top thereof, and the discharge may heat or cool the camera drive motor and the rollers that mount the rotatable hemisphere. To achieve the ballistic rating economically, the inner layer is formed of aluminum, and the inner layer is used as the mold for vacuum forming the outer, thermoplastic, layers.

1 Claim, 1 Drawing Sheet

Fig_1
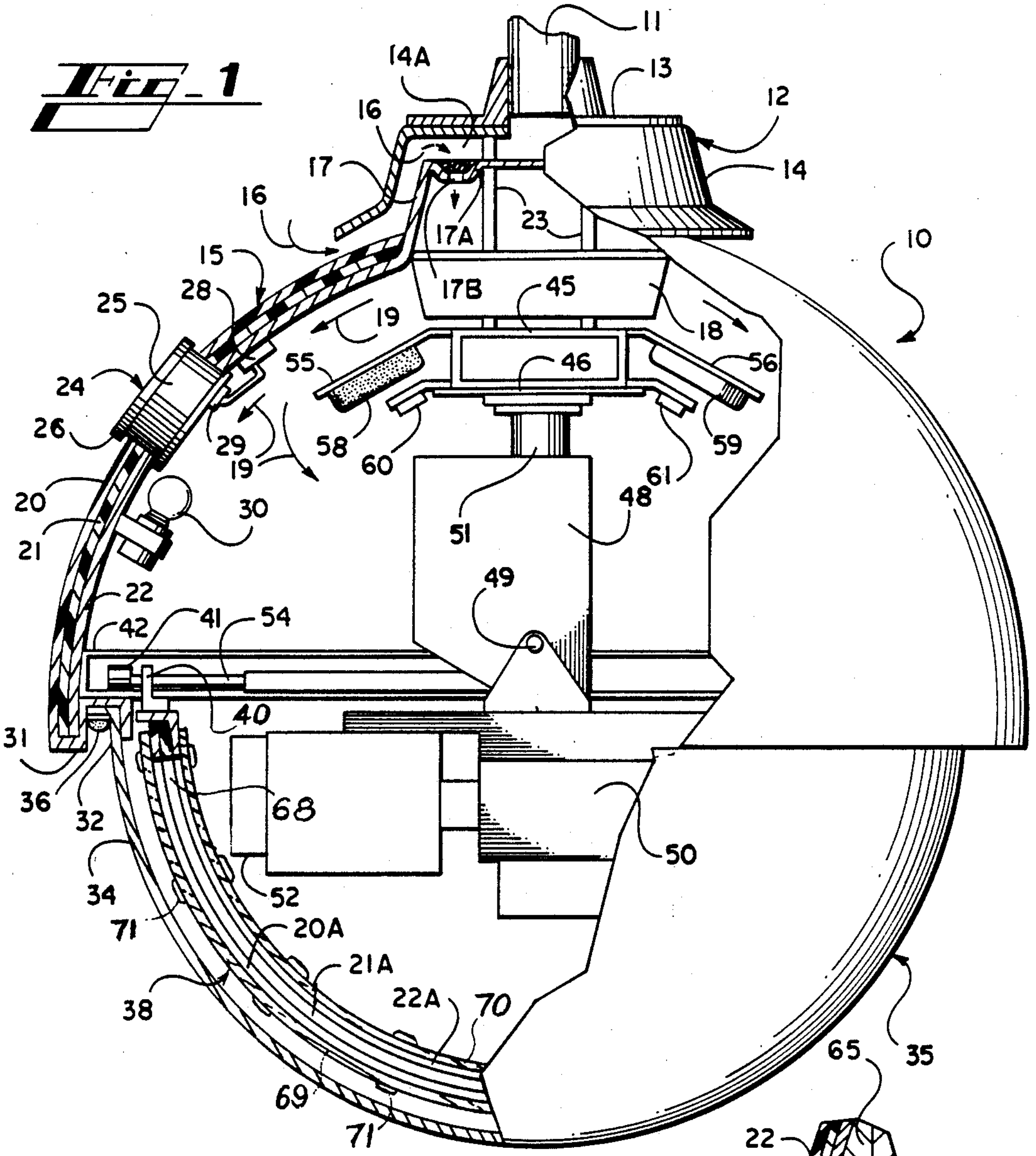
Fig_2
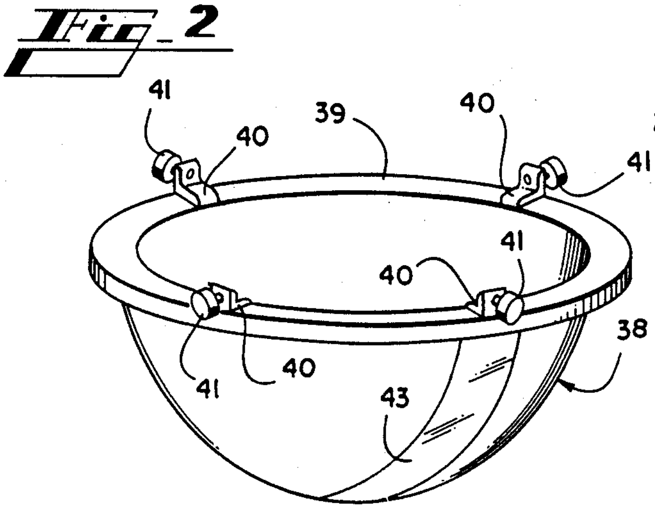
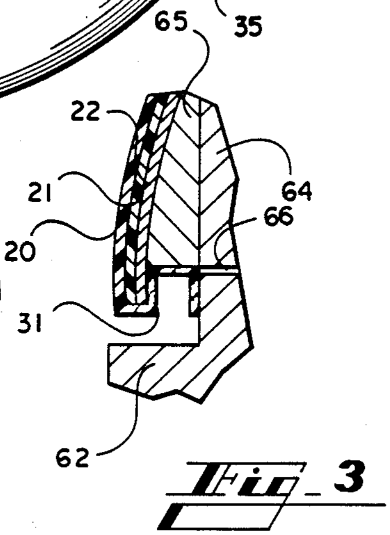
Fig_3

BALLISTIC RATED CAMERA HOUSING AND METHOD FOR FORMING

CROSS-REFERENCE TO RELATED APPLICATIONS

This is a division of application Ser. No. 07/064,401 filed June 22, 1987, issued as U.S. Pat. No. 4,796,039, on January 3, 1989.

INFORMATION DISCLOSURE STATEMENT

It is very common to use closed circuit television cameras for remote surveillance of an area. In locations such as banks and retail stores, it is rather common to mount a television camera in plain view of customers. This is possible because the camera is indoors, and is sufficiently protected to prevent unauthorized tampering and the like.

When a surveillance camera is to be placed outdoors, the camera must be enclosed within a weatherproof housing; and, one successful housing was invented by the present applicant and is disclosed in U.S. Pat. No. 4,320,949. Since the housing is to be mounted outdoors, the housing must be both weatherproof and tamperproof, and the mentioned patent is designed to achieve these ends.

Camera housings such as that shown in U.S. Pat. No. 4,320,949 are acceptable for numerous outdoor locations; however, there are some locations in which it is somewhat likely that the surveillance camera might be intentionally disabled through the use of rocks or other missiles, or even by gun fire. There is sufficient terrorist activity that airports, seaports, military installations and other likely targets require surveillance, and require considerable protection for the surveillance camera.

The prior art includes some bullet-proof camera housings, but the prior art housings are generally shielded with steel plate which renders them extremely heavy. Additionally, the camera body is usually shielded, but a hole remains to allow the camera to see the area. This viewing area is vulnerable to firearms. Furthermore, the housing is usually supported above a pan and tilt drive motor, and the drive motor is not protected. Thus, the drive motor, the "eye" of the housing, and electric cables for both motor and camera are normally vulnerable in a prior art bullet-proof housing.

SUMMARY OF THE INVENTION

This invention relates generally to surveillance camera housings, and is more particularly concerned with a light-weight camera housing that is secure against missiles, and a method for constructing the housing.

The present invention provides an outdoor camera housing of generally spherical shape to provide minimum possibility of damage by wind and the like. The invention includes an upper dome and a lower dome formed of a plurality of layers so that the domes are bullet proof, and a method for forming the domes. The lower dome is carried by the upper dome, the lower dome including an outer cover of generally transparent material, and an inner portion that is bullet proof. The inner portion of the lower dome is rotatably mounted with respect to the upper dome, and includes a viewing window for the camera, the inner portion of the lower dome being rotatable with the camera so that the lens of the camera is always at the viewing window.

The housing of the present invention is mounted by means of a conduit or the like, all wiring for the housing being contained within the conduit. All electrical components for the camera and camera control are contained within the housing so that no portion of the surveillance camera can be readily disabled, and the housing has a blower in the upper portion for temperature control of the apparatus within the housing.

BRIEF DESCRIPTION OF THE DRAWINGS

These and other features and advantages of the present invention will become apparent from consideration of the following specification when taken in conjunction with the accompanying drawings in which:

FIG. 1 is a side elevational view of a camera housing made in accordance with the present invention, the housing being partially broken away to show the construction thereof;

FIG. 2 is a perspective view showing the inner portion of the lower dome; and, FIG. 3 is a fragmentary cross-sectional view showing the means for vacuum forming the upper dome.

DETAILED DESCRIPTION OF THE EMBODIMENT

Referring now more particularly to the drawings, and to that embodiment of the invention here presented by way of illustration, FIG. 1 illustrates the camera housing 10 and a mounting conduit 11. The conduit 11 is fixed to a cap 12 through an appropriate flange or the like as is well known in the art.

Looking at the cap 12 in more detail as is shown in FIG. 1, there is a flange 13 for receiving the conduit 11, the conduit 11 being fixed to the flange by welding or the like. The flange 13 rests upon the outer shroud 14, and the shroud 14 covers the boss 17 which extends from the upper dome. It should be noted that the outer shroud 14 has a plurality of ribs 14A to space the shroud 14 from the boss 17 and allow air flow between the shroud 14 and the boss 17.

The boss 17 is provided with an annular filter housing 17A. The filter housing 17A contains appropriate air filtering material; and, the housing 17A defines a plurality of openings 17B to allow air to flow completely through the filter housing.

It should next be seen that there is a plurality of studs 23 that may be fixed to the flange 13 and pass through the shroud 14 and boss 17, then into the housing 10 to be fixed to the flange 13 and pass through the shroud 14 and boss 17, then into the housing 10 to be fixed to a retaining plate. The retaining plate, then, mounts a blower 18, and additional structure to be described hereinafter depends from this same mounting arrangement.

From the above description, it should be understood that the blower 18 will be operated to take in air through the filter material in the filter housing 17A, the blower then discharging air radially of the blower as indicated by the arrows 19. The intake for the blower 18 is under the shroud 14 and through the filter housing 17A as indicated by the arrows 16. Thus, the blower 18 brings in outside air, causes the air to be filtered, and discharges the air in a direction generally along the interior wall of the camera housing 10.

In the cross-sectioned portion of the upper dome 15, it will be noted that the upper dome 15 is formed of three layers. There is an outer layer 20 that is formed of a plastic alloy such as an alloy of acrylonitrile butadiene-styrene and Dow "Rovel". The "Rovel" is a styrene copolymer such as styrene acrylonitrile (SA) or ethylene propylene diene rubber modified styrene (EPDM). Those skilled in the art will understand that other materials, and other plastic alloys, may be selected, but the ABS/"Rovel" has been found to be acceptable. The layer 20, then, provides excellent strength to the ballistic quality of the upper dome 15, and is also not degraded by ultraviolet radiation and transmits a negligible amount of ultraviolet.

The second layer in the upper dome is designated at 21, and may comprise a an acrylic plastic. Several acrylics are commerically available, and all have good strength characteristics, so a person of ordinary skill can easily select a particular product. Finally, the innermost layer 22 is a ballistic grade aluminum. The aluminum layer 22 adds to the strength of the upper dome 15, but is still sufficiently light in weight as to be tolerable in the present invention.

Thus, the first two layers can be easily vacuum formed for economy in production. While those skilled in the art will readily devise many methods for providing the layers of the upper dome 15, an economical and efficient method is illustrated in FIG. 3.

It will be understood that the innermost layer 22 will be formed by casting, stamping, spinning or other known technique though, though the shape is well adapted for spinning. Once the aluminum layer 22 is formed, the layer 22 can be utilized as the mold for the thermoplastic layers 20 and 21. In general, a thermoplastic sheet will be heated, then urged against the aluminum layer 22.

FIG. 3 illustrates a jig for vacuum forming the thermoplastic layers 20 and 21, the jig including a base 62 having a support 64 for engaging the interior of the aluminum layer 22 to hold the layer 22 in position. The support 64 may include a break-away perimeter 65 as will be discussed more fully hereinafter. The support 64 includes vacuum application means, here illustrated as a port 66 for applying vacuum between the thermoplastic sheet being formed and the aluminum layer 22.

With the arrangement described, it will be understood that a thermoplastic sheet, such as the acrylic layer 21, will be held, and heated to the point that it is formable. The sheet will then be placed over the aluminum layer 22 which will act as the mold for the vacuum forming process. Though either the sheet or the mold may be moved, it is efficient to hold the sheet of thermoplastic and to urge the aluminum layer 22 into the heated sheet. As the form moves into the heated sheet, air will be removed from between the sheet, or layer 21 and the layer 22 through the port 66, so the layer 21 will form snugly against the layer 22.

After the layer 21 has been formed over the layer 22, the same process can be repeated for the layer 20. Thus, the thermoplastic alloy for the layer 20 will be held, and heated, and the form will be urged against the heated sheet while air is removed through the port 66.

It will be noted that the inverted channel 31 is here shown as formed integrally with the layer 20. While the channel 31 may be separately formed and subsequently attached, it may also be formed integrally as illustrated.

In FIG. 3 of the drawings it will be noticed that the support 64 is carried by the base 62, and the break-away perimeter 65 is spaced above the base 62. The vacuum port 66 connects to the open space so formed. Thus, as the heated thermoplastic sheet forms the outer layer 20, the edges of the sheet will generally cover the open space. The vacuum will cause the plastic sheet to move in; and, by removing air from between the sheet of layer 20 and the jig, the sheet will conform to the jig, wrapping around the layers 21 and 22 and lying against the perimeter 65 and support 64.

Once the thermoplastic has cooled and set, it will be seen that the inverted channel 31 would prevent removal of the jig. The break-away perimeter 65 allows removal of the completed dome; then, the perimeter 65 is removed from within the dome and reinstalled on the base 64 for the next dome, and the entire process can be repeated.

It will be noticed in FIG. 1 that there is an access hole generally designated at 24. The access hole 24 includes a casing 25 having a cover 26 thereover. Though not here shown in detail, it will be understood by those skilled in the art that the cover 26 will be appropriately hinged, and will be provided with locking means as desired.

Within the upper dome 15, there is a switch 28 having an arm 29 in engagement with the access hole 24. The switch 28 therefore acts as a tamper switch to indicate that the cover 26 has been opened. The switch 28 may also be used as switch means for illuminating the light 30. The object of the access hole 24 is to allow certain minor adjustments to be made without disassembling the housing 10. Therefore, the light 30 provides sufficient internal illumination for such adjustments.

With attention to the lower edge of the upper dome 15, it will be seen that the outer layer 20 bends around the layers 21 and 22, then provides an inverted channel designated at 31. This inverted channel 31 receives the peripheral flange 32 of the outer cover 34 of the lower dome 35.

The outer cover 34 is preferably formed of an acrylic sheet such as methyl methacrylate. It is known in the art to use a somewhat smoky color to obscure a view of the inside of the housing 10. The color of the outer cover 34 can be selected to obscure the inside of the housing as much as possible without undesirably reducing the light transmitted to the camera, though it should be recognized that the purpose in the present invention is primarily to obscure the viewing window.

Also in the inverted channel 31, it will be noted that there is a microphone designated at 36. The microphone 36 may comprise a button-like member that will not be readily visible, and the wiring for the microphone will of course be within the housing 10.

The inner portion 38 of the lower dome 35 is here shown as being formed of three layers. The three layers are designated as 20A, 21A and 22A since the layers of the inner portion correspond to the layers 20, 21 and 22 of the upper dome 15.

It will be seen that the inner layer 22A has an outwardly turned flange 39 which receives a plurality of angled brackets 40. Each of the brackets 40 carries a roller 41 which is movably received within an annular channel 42 within the upper dome 15, the channel 42 being disposed on the inverted channel 31.

Looking at FIG. 2 of the drawings, it will be noticed that there are four of the rollers 41 disposed approximately 90 degrees apart around the flange 39. The inner portion 38 is therefore securely mounted, but is rotatable about its vertical axis. Also shown in FIG. 2, there is a viewing window designated at 43. It will be realized that the material from which the inner portion 38 is constructed is not transparent, so a viewing means must be provided for the camera. The window 43 is formed of a transparent material such as "Lexan" or comparable materials. "Lexan" is a polycarbonate made by General Electric and is available with and without a glass fiber filler. Thus, the window 43 provides sufficient transparency for adequate survillance, but has sufficent strength to withstand considerable abuse.

The construction of the window 43 is shown in more detail in FIG. 1 of the drawings, where it will be seen that there is an opening 68 through the three layers 20A, 21A and 22A of the inner portion 38 of the lower dome 35. This opening 68 is then covered by two sheets of transparent polycarbonate designated at 69 and 70.

It will first be understood that polycarbonate sheet is rather tough, and provides good protection against abuse. Additionally, a first sheet 69 is fixed over the opening 68 against the outer layer 20A, and a second sheet 70 is fixed over the opening 68 against the inner layer 22A. This results in a space between the two sheets 69 and 70.

Since the inner portion 38 of the lower dome 35 rotates with the camera 50, the window 43 needs to extend only around 90°, or about to the low point of the inner portion 38. To provide the window 43, then, the opening 68 is provided, and sheets of transparent polycarbonate are heated and shaped to fit over the opening. Rivets 71 or similar fastening means can be used to hold the sheets 69 and 70 in place.

It will be understood that, if a round of ammunition is fired at the window 43, first the outer cover 34 will provide some slowing of the round. If the round penetrates the outer cover 34, it will then engage the outer sheet 69 of the window 43. Though the sheet 69 may be penetrated, the round will have been slowed, and the tip will have become flattened. Because of the space between the sheets 69 and 70, the round must naturally penetrate the sheet 70, but after the tip of the round has become flattened. Therefore, full penetration of the window 43 is quite difficult, and is unlikely for most of the commonly used firearms.

Looking further at FIG. 1 of the drawings and the inside of the upper dome 15, it should be understood that the bracket 45 extending from the blower 18 carries a plurality of items. First, a plate 46 is the camera mounting plate, the camera motor 48 extending therefrom. The motor 48 includes a pivot 49 about which the camera 50 is pivotable. Those skilled in the art will therefore understand that the motor 48 is rotatable through a full 360 degrees, rotating about the shaft 51. Simultaneously, the camera 50 is pivotal about the pivot 49 so that the lens 52 can move from the horizontal position shown to a vertical position. There is a connecting rod 54 extending between the bracket 40 and the motor housing 48 so that, as the motor housing 48 rotates about the shaft 51, the inner portion 38 of the lower dome 35 is also caused to rotate.

Returning to the bracket 45, it will be seen that there are two plates 55 and 56 extending in opposite directions therefrom. The plate 55 carries a microprocessor 58 that will store a scanning program, and provide the necessary control commands for the equipment. The plate 56 carries an amplifier 59 to amplify the audio signal from the microphone 36.

Finally, the lower edges of the bracket 45 carry electric heaters 60 and 61. The heaters 60 and 61 are flat, resistance heaters that can be energized when desired to maintain the equipment within the housing 10 at the desired temperature.

From the above description, it should now be understood that the camera housing of the present invention provides an upper dome 15 that can be appropriately mounted by means of the conduit 11, and a lower dome 35 having a viewing window for the camera 50. Both the upper dome and the lower dome are light in weight, yet are ballistically rated. With the materials discussed, a nine millimeter round of ammunition will not pierce the housing.

When the weather is hot, the blower 18 can be operated to bring fresh air into the housing. The air will be filtered through the filtering material in the filter housing 17A, and will then move along the surface of the dome. Because of the shape of the dome and the placement of the blower 18 it will be understood that heat will accumulate at the blower and be readily dispersed by the blower.

It is important to note that the camera motor 48 will be cooled, along with the camera 50. Additionally, with a housing 10 as illustrated, the air from the blower 18 bathes the rollers 41 to maintain a proper operating temperature. Such rollers are usually permanently lubricated, and excess heat may cause loss of lubricant while excess cold may cause sluggish movement.

When the weather is cold, the heaters 60 and 61 can be energized, and the above described cooling will become warming. The same blower 18 causes air to pass over the heaters 60 and 61 to disperse heated air. Even if the heaters are not in the direct air stream, convection currents will rise towards the blower, and the heated air will be dispersed.

While an access hole is provided to allow easy service, the access hole will be made of sufficiently heavy metal or the like as to be bullet proof, and it further includes a tamper-switch to provide a signal in the event of unauthorized tampering.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A housing for a surveillance camera said housing including an upper dome, a boss extending centrally upwardly from said upper dome and defining openings therethrough, a shroud generally covering and spaced above said boss for allowing air flow between said shroud and said boss, a filter housing in said boss covering said openings for providing a flow of filtered air through said boss and into said housing, and a blower mounted within said housing below said boss for dispersing said filtered air throughout said housing, and further including a camera motor disposed below said blower, said blower acting to cool said camera motor, said upper dome being hemi-spherical, said boss being located at the upper polar position on the hemisphere so that warm air rises towards said boss and said blower, said blower being so constructed and arranged as to direct air along the hemi-spherical interior surface of said upper dome so that said filtered air is mixed with said warm air and dispensed in said housing.

* * * * *